United States Patent
Lee et al.

(10) Patent No.: US 10,512,023 B2
(45) Date of Patent: Dec. 17, 2019

(54) METHOD FOR TRIGGERING CONNECTION ESTABLISHMENT BETWEEN REMOTE UE AND RELAY UE IN A COMMUNICATION SYSTEM AND APPARATUS THEREFOR

(71) Applicant: LG ELECTRONICS INC., Seoul (KR)

(72) Inventors: Jaewook Lee, Seoul (KR); Taehun Kim, Seoul (KR); Sungduck Chun, Seoul (KR)

(73) Assignee: LG Electronics Inc., Seoul (KR)

(*) Notice: Subject to any disclaimer, the term of this patent is extended or adjusted under 35 U.S.C. 154(b) by 9 days.

(21) Appl. No.: 15/673,904

(22) Filed: Aug. 10, 2017

(65) Prior Publication Data

US 2018/0049099 A1 Feb. 15, 2018

Related U.S. Application Data

(60) Provisional application No. 62/373,373, filed on Aug. 11, 2016.

(51) Int. Cl.

| | |
|---|---|
| *H04L 12/28* | (2006.01) |
| *H04W 40/22* | (2009.01) |
| *H04W 40/12* | (2009.01) |
| *H04W 72/08* | (2009.01) |
| *H04W 76/10* | (2018.01) |
| *H04W 76/14* | (2018.01) |
| *H04W 88/04* | (2009.01) |
| *H04W 8/00* | (2009.01) |

(52) U.S. Cl.
CPC .......... *H04W 40/22* (2013.01); *H04W 40/12* (2013.01); *H04W 72/085* (2013.01); *H04W 76/10* (2018.02); *H04W 76/14* (2018.02); *H04W 8/005* (2013.01); *H04W 88/04* (2013.01)

(58) Field of Classification Search
CPC ..... H04W 76/10; H04W 76/14; H04W 8/005; H04W 72/085; H04W 40/12
See application file for complete search history.

(56) References Cited

U.S. PATENT DOCUMENTS

2015/0351020 A1* 12/2015 Lin ................. H04W 8/005
455/404.1
2018/0070400 A1* 3/2018 Wu ................. H04W 4/06

* cited by examiner

*Primary Examiner* — Bo Hui A Zhu
(74) *Attorney, Agent, or Firm* — Dentons US LLP

(57) ABSTRACT

The present invention relates to a method for transmitting a sidelink signal by a user equipment (UE) in a wireless communication system. The method comprises receiving, from a network, a threshold value for a transmission of the sidelink signal; receiving, from the network, an indicator indicating at least one of a specific UE category and a specific service type allowed to transmit the sidelink signal regardless of the threshold value; if a category of the UE is not the specific UE category and the UE is not operating with the specific service type, measuring quality of a serving cell of the UE; and if the quality of the serving cell is less than the threshold value, transmitting the sidelink signal to a target UE, wherein, if the category of the UE is the specific UE category or the UE is operating with the specific service type, the sidelink signal is transmitted to the target UE regardless of the threshold value.

6 Claims, 14 Drawing Sheets

(A) Control-plane protocol stack (B) User-plane protocol stack (a)

(b)

METHOD FOR TRIGGERING CONNECTION ESTABLISHMENT BETWEEN REMOTE UE AND RELAY UE IN A COMMUNICATION SYSTEM AND APPARATUS THEREFOR

This application claims the benefit of the U.S. Patent Application No. 62/373,373 filed on Aug. 11, 2016, which is hereby incorporated by reference as if fully set forth herein.

BACKGROUND OF THE INVENTION

Field of the Invention

The present invention relates to a wireless communication system and, more particularly, to a method for triggering connection establishment between a remote UE and a relay UE in a communication system and an apparatus therefor.

Discussion of the Related Art

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

SUMMARY OF THE INVENTION

The object of the present invention can be achieved by providing a method for transmitting a sidelink signal by a user equipment (UE) in a wireless communication system. The method comprises receiving, from a network, a threshold value for a transmission of the sidelink signal; receiving, from the network, an indicator indicating at least one of a specific UE category and a specific service type allowed to transmit the sidelink signal regardless of the threshold value; if a category of the UE is not the specific UE category and the UE is not operating with the specific service type, measuring quality of a serving cell of the UE; and if the quality of the serving cell is less than the threshold value, transmitting the sidelink signal to a target UE, wherein, if the category of the UE is the specific UE category or the UE is operating with the specific service type, the sidelink signal is transmitted to the target UE regardless of the threshold value.

In another aspect of the present invention provided herein is a user equipment (UE) in a wireless communication system. The UE comprises a radio frequency (RF) unit; and a processor connected with the RF unit. Here, the processor is configured to: receive, from a network, a threshold value for a transmission of a sidelink signal; receive, from the network, an indicator indicating at least one of a specific UE category and a specific service type allowed to transmit the sidelink signal regardless of the threshold value; measure quality of a serving cell of the UE if a category of the UE is not the specific UE category and the UE is not operating with the specific service type; and transmitting the sidelink signal to a target UE if the quality of the serving cell is less than the threshold value. Especially, the category of the UE is the specific UE category or the UE is operating with the specific service type, the sidelink signal is transmitted to the target UE regardless of the threshold value.

Preferably, if the quality of the serving cell is greater than or equal to the threshold value, the sidelink signal is not transmitted to the target UE.

Preferably, the sidelink signal comprises a discovery signal for discovering the target UE or for announcing an existence of the UE.

Preferably, the specific service type comprises a public safety service type.

More preferably, the UE may transmit a UE capability information including the category of the UE to the network. In this case, the indicator is allowed to transmit the sidelink signal regardless of the threshold value when the category of the UE is the specific UE category.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

DETAILED DESCRIPTION OF THE INVENTION

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
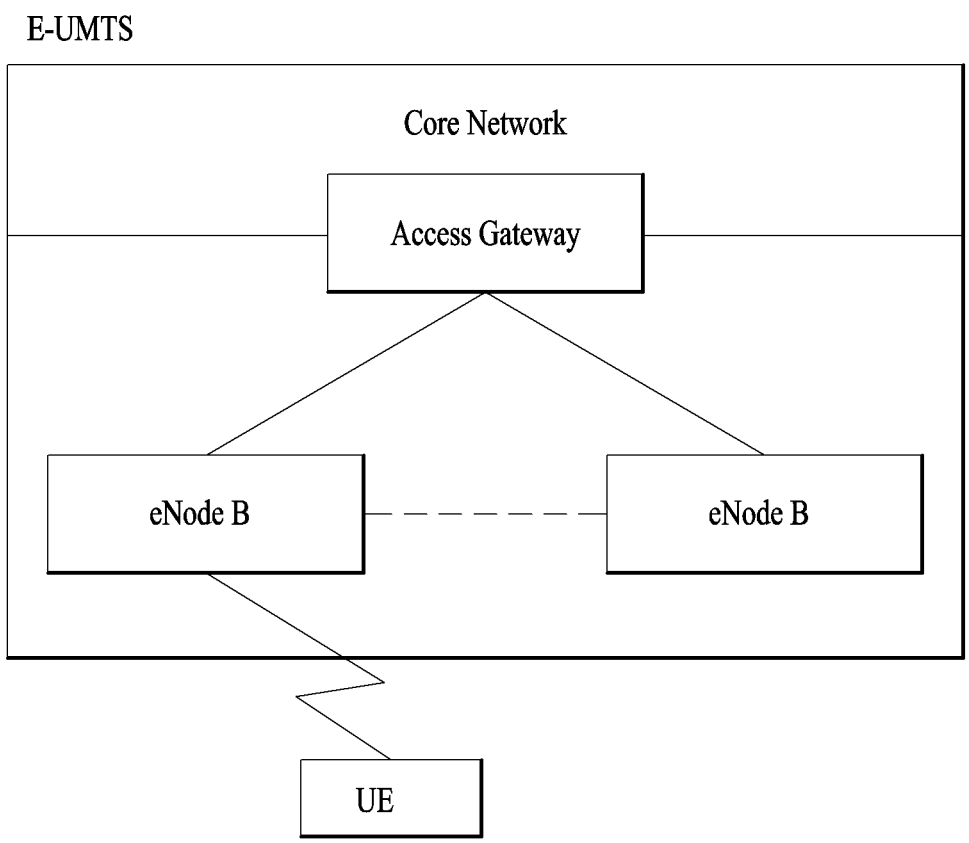
FIG. 1 is a diagram showing a network structure of an Evolved Universal Mobile Telecommunications System (E-UMTS) as an example of a wireless communication system.
Figure 2:
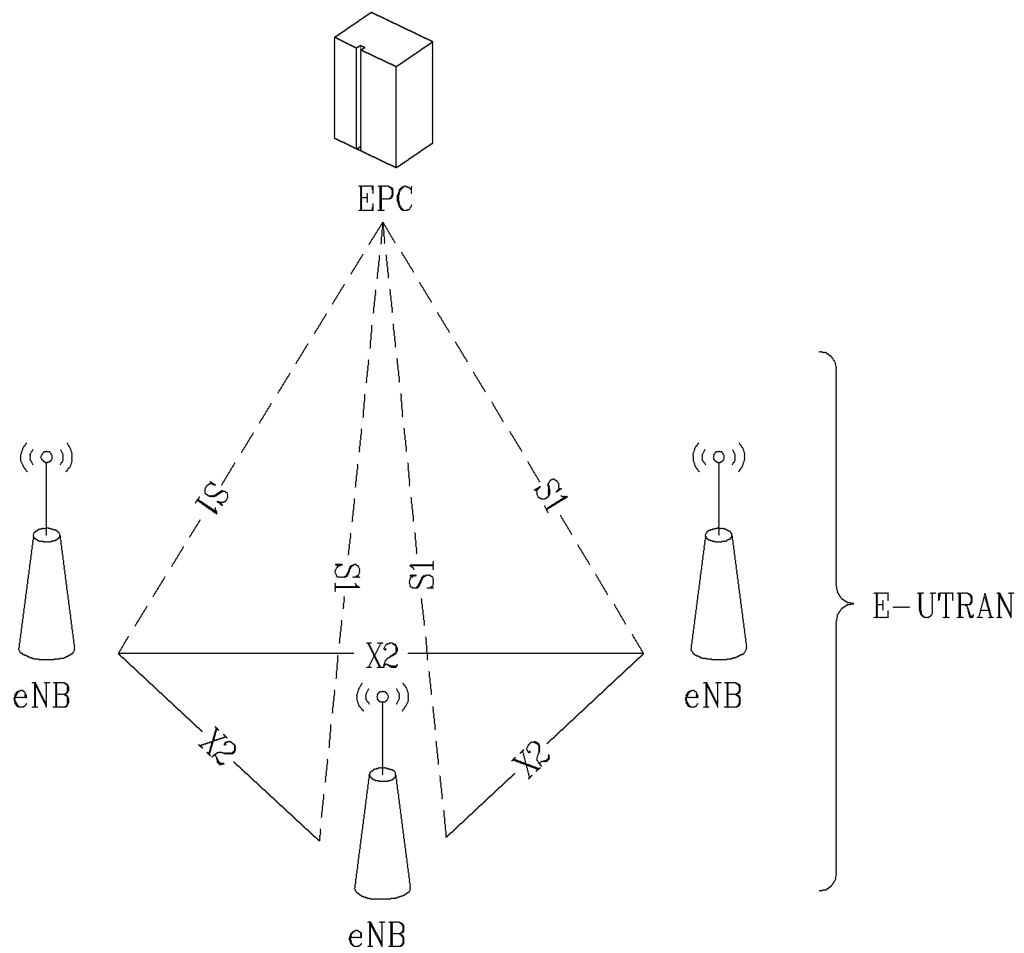
FIG. 2 is a diagram showing the concept of a network structure of an Evolved Universal Terrestrial Radio Access Network (E-UTRAN).

FIG. 2 is a diagram showing the concept of a network structure of an Evolved Universal Terrestrial Radio Access Network (E-UTRAN). In particular, the E-UTRAN system is a system evolved from the existing UTRAN system. The E-UTRAN includes cells (eNBs) and cells are connected via an X2 interface. A cell is connected to a user equipment (UE) via an air interface and is connected to an evolved packet core (EPC) via an S1 interface.

The EPC includes a mobility management entity (MME), a serving-gateway (S-GW) and a packet data network-gateway (PDN-GW). The MME has access information of a UE and information about capabilities of the UE. Such information is mainly used for mobility management of the UE. The S-GW is a gateway having an E-UTRAN as an end point and the PDN-GW is a gateway having a PDN as an end point.

Figure 3:
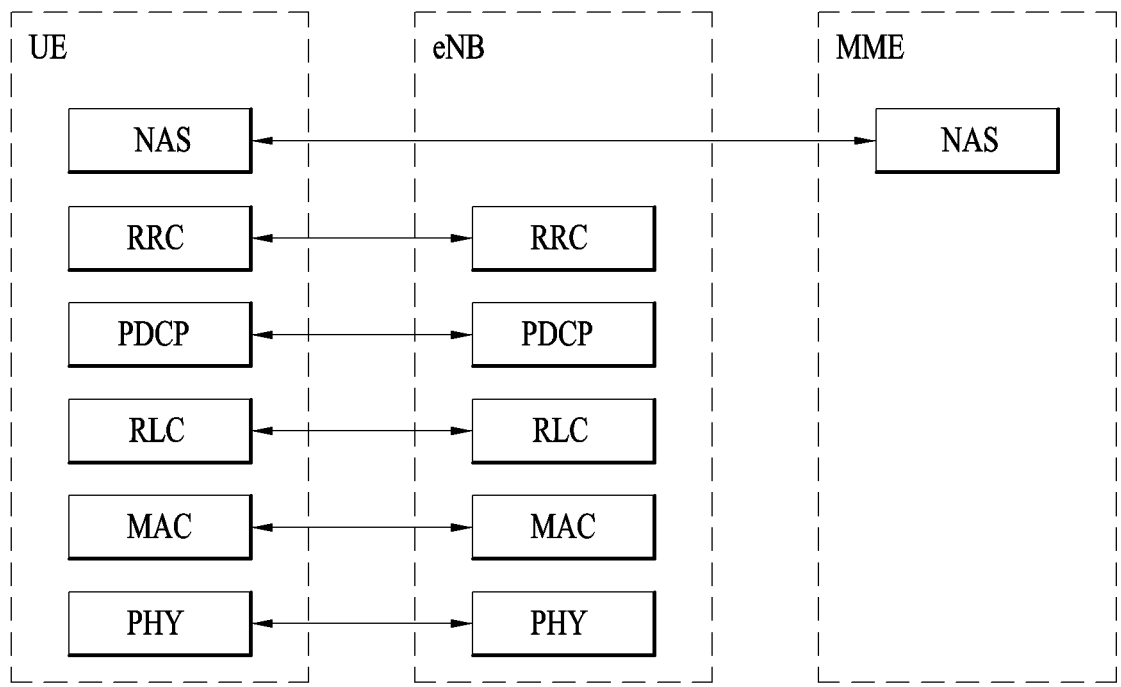
FIG. 3 is a diagram showing a control plane and a user plane of a radio interface protocol between a User Equipment (UE) and an Evolved Universal Terrestrial Radio Access Network (E-UTRAN) based on a 3rd Generation Partnership Project (3GPP) radio access network standard.
Figure 3:
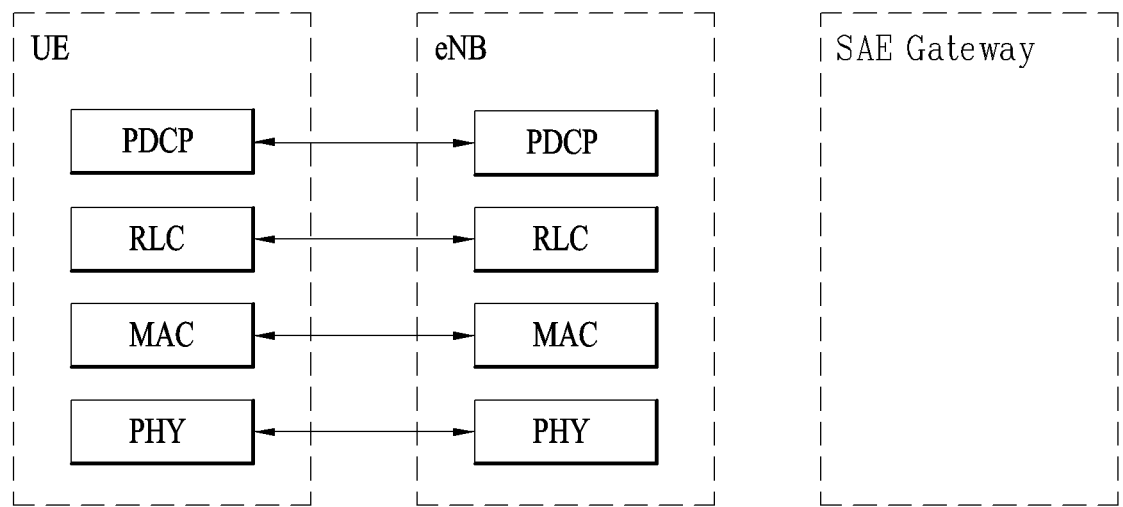

FIG. 3 shows a control plane and a user plane of a radio interface protocol between a UE and an Evolved Universal Terrestrial Radio Access Network (E-UTRAN) based on a 3GPP radio access network standard. The control plane refers to a path used for transmitting control messages used for managing a call between the UE and the network. The user plane refers to a path used for transmitting data generated in an application layer, e.g., voice data or Internet packet data.

A physical (PHY) layer of a first layer provides an information transfer service to a higher layer using a physical channel. The PHY layer is connected to a Medium Access Control (MAC) layer located on a higher layer via a transport channel. Data is transported between the MAC layer and the PHY layer via the transport channel. Data is also transported between a physical layer of a transmitting side and a physical layer of a receiving side via a physical channel. The physical channel uses a time and a frequency as radio resources. More specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A medium access control (MAC) layer, a radio link control (RLC) layer and a packet data convergence protocol (PDCP) layer may be located in a second layer. The MAC layer of the second layer serves to map various logical channels to various transport channels. The MAC layer performs a logical channel multiplexing function for mapping several logical channels to one transport channel. The MAC layer is connected to a Radio Link Control (RLC) layer, which is a higher layer, via a logical channel, and the logical channel may be roughly divided into a control channel for transmitting information about the control plane and a traffic channel for transmitting information about the user plane, according to the type of transmitted information.

The RLC layer of the second layer segments and concatenates data received from a higher layer, thereby controlling a data size suitable for enabling a lower layer to transmit data in a radio interval. The RLC layer provides three modes, namely, a transparent mode (TM), an unacknowledged mode (UM) and an acknowledged mode (AM) to support a variety of QoS requested by each radio bearer (RB). Especially, for reliable data transmission, the AM RLC performs a function to retransmit data through automatic repeat request (ARQ).

The packet data convergence protocol (PDCP) layer of the second layer performs a header compression function for reducing the size of an IP packet header which is relatively great in size and includes unnecessary control information in order to efficiently transmit IP packets, such as IPv4 or EPv6 packets, in a radio interval with a relatively narrow bandwidth. Accordingly, only necessary information need be included in the header part of data for transmission, so as to increase transmission efficiency of a radio interval. In the LTE system, the PDCP layer also performs a security function. The security function includes a ciphering function for preventing data monitoring from a third party, and an integrity protection function for preventing third party data manipulation.

A radio resource control (RRC) layer of the third layer is defined only in the control plane. The RRC layer handles logical channels, transport channels and physical channels for the configuration, re-configuration and release of radio bearers (RBs). Here, a radio bearer (RB) denotes a service provided by the second layer for data transfer between the UE and the network. The RRC layers of the UE and the network exchange RRC messages with each other.

The RB may be broadly divided into two bearers, that is, a signaling radio bearer (SRB) used to transmit an RRC message on a control plane and a data radio bearer (DRB) used to transmit user data on a user plane. The DRB may be divided into a UM DRB using UM RLC and AM DRB using AM RLC according to method for operating RLC.

Hereinafter, an RRC state of a UE and an RRC connection method will be described. The RRC state, which indicates whether the RRC layer of the UE is logically connected to the RRC layer of the E-UTRAN, is called an RRC_CONNECTED state if the RRC layers are connected and is called an RRC_IDLE state if the RRC layers are not connected.

Since the E-UTRAN detects presence of a UE in an RRC_CONNECTED state in cell units, it is possible to efficiently control the UE. In contrast, the E-UTRAN cannot detect a UE in an RRC_IDLE state in cell units and a core network (CN) manages the UE in an RRC_IDLE state in units of TA which is greater than a cell. That is, the UE in the RRC_IDLE state transitions to the RRC_CONNECTED state in order to receive a service such as voice or data from a cell.

In particular, when a user first turns a UE on, the UE searches for an appropriate cell and then camps on an RRC_IDLE state in the cell. The UE in the RRC_IDLE state performs an RRC connection establishment process with the RRC layer of the E-UTRAN to transition to the RRC_CONNECTED state when RRC connection needs to be established. The RRC connection needs to be established when uplink data transmission is necessary due to call connection attempt of a user, when a response message is transmitted in response to a paging message received from the E-UTRAN, etc.

A non-access stratum (NAS) layer located above the RRC layer performs a function such as session management and mobility management. In the NAS layer, two states such as an EPS mobility management-REGISTERED (EMM-REGISTERED) state and an EMM-UNREGISTERED state are defined in order to manage mobility of a UE. These two states are applied to the UE and the MME. A UE is first in the EMM-UNREGISTERED state and performs a process of registering with a network through an initial attach procedure in order to access the network. If the attach procedure is successfully performed, the UE and the MME enter the EMM-REGISTERED STATE.

In the NAS layer, in order to manage signaling connection between the UE and the EPC, an EPS connection management (ECM)-IDLE state and an ECM_CONNECTED state are defined and applied to the UE and the MME. If a UE in the ECM-IDLE state is RRC connected to the E-UTRAN, the UE enters the ECM-CONNECTED state. If the MME in the ECM-IDLE state is S1 connected to the E-UTRAN, the MME enters the ECM-CONNECTED state.

When the UE is in the ECM-IDLE state, the E-UTRAN does not have context information of the UE. Accordingly, the UE in the ECM-IDLE state performs a UE-based mobility associated procedure, such as cell selection or reselection, without receiving a command of the network. In contrast, if the UE is in the ECM-CONNECTED state, mobility of the UE is managed by the command of the network. If the location of the UE is changed in the ECM-IDLE state, the UE informs the network of the location thereof via a tracking area (TA) update procedure.

In an LTE system, one cell configuring an eNB is configured to use a bandwidth such as 1.25, 2.5, 5, 10, 15 or 20 MHz to provide a downlink or uplink transmission service to several UEs. Different cells may be configured to provide different bandwidths.

Downlink transport channels for transmission of data from the network to the UE include a Broadcast Channel (BCH) for transmission of system information, a Paging Channel (PCH) for transmission of paging messages, and a downlink Shared Channel (SCH) for transmission of user traffic or control messages. Traffic or control messages of a downlink multicast or broadcast service may be transmitted through a downlink SCH and may also be transmitted through a downlink multicast channel (MCH).

Uplink transport channels for transmission of data from the UE to the network include a Random Access Channel (RACH) for transmission of initial control messages and an uplink SCH for transmission of user traffic or control messages. Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 4:
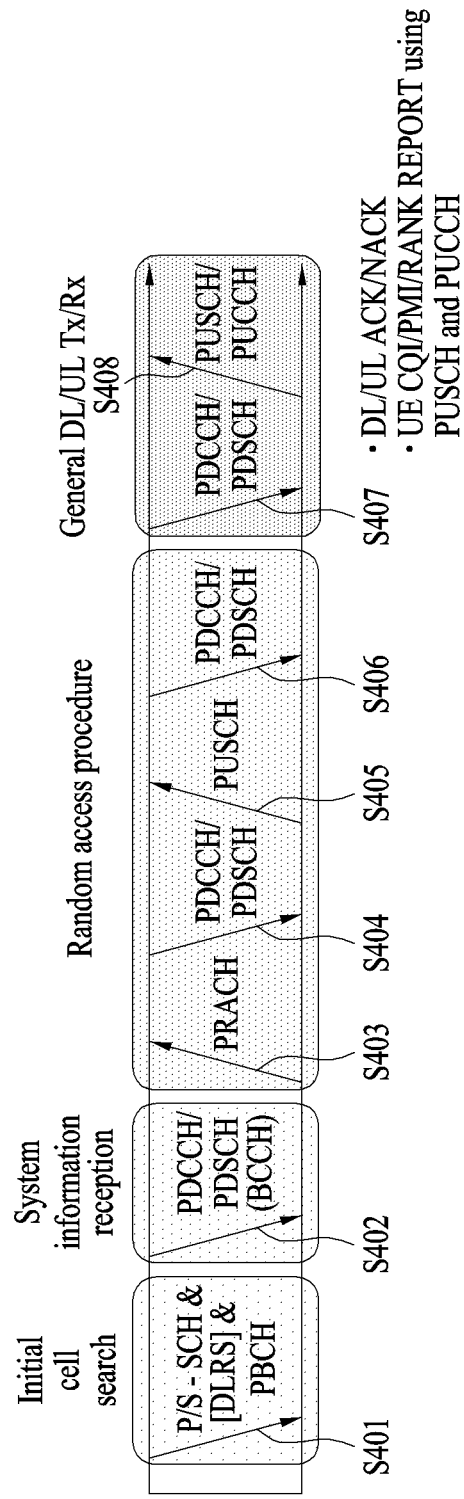
FIG. 4 is a diagram showing physical channels used in a 3GPP system and a general signal transmission method using the same.

FIG. 4 is a diagram showing physical channels used in a 3GPP system and a general signal transmission method using the same.

A UE performs an initial cell search operation such as synchronization with an eNB when power is turned on or the UE enters a new cell (S401). The UE may receive a Primary Synchronization Channel (P-SCH) and a Secondary Synchronization Channel (S-SCH) from the eNB, perform synchronization with the eNB, and acquire information such as a cell ID. Thereafter, the UE may receive a physical broadcast channel from the eNB so as to acquire broadcast information within the cell. Meanwhile, the UE may receive a Downlink Reference Signal (DL RS) so as to confirm a downlink channel state in the initial cell search step.

The UE which has completed the initial cell search may receive a Physical Downlink Control Channel (PDCCH) and a Physical Downlink Shared Channel (PDSCH) according to information included in the PDCCH so as to acquire more detailed system information (S402).

Meanwhile, if the eNB is initially accessed or radio resources for signal transmission are not present, the UE may perform a Random Access Procedure (RACH) (step S403 to S406) with respect to the eNB. In this case, the UE may transmit a specific sequence through a Physical Random Access Channel (PRACH) as a preamble (S403), and receive a response message to the preamble through the PDCCH and the PDSCH corresponding thereto (S404). In case of contention based RACH, a contention resolution procedure may be further performed.

The UE which has performed the above procedures may perform PDCCH/PDSCH reception (S407) and Physical Uplink Shared Channel PUSCH)/Physical Uplink Control Channel (PUCCH) transmission (S408) as a general uplink/downlink signal transmission procedure. In particular, the UE receives downlink control information (DCI) via a PDCCH. The DCI includes control information such as resource allocation information of the UE and the format thereof is changed according to use purpose.

The control information transmitted from the UE to the eNB in uplink or transmitted from the eNB to the UE in downlink includes a downlink/uplink ACK/NACK signal, a Channel Quality Indicator (CQI), a Precoding Matrix index (PMI), a Rank Indicator (RI), and the like. In case of the 3GPP LTE system, the UE may transmit the control information such as CQI/PMI/RI through the PUSCH and/or the PUCCH.

Figure 5:
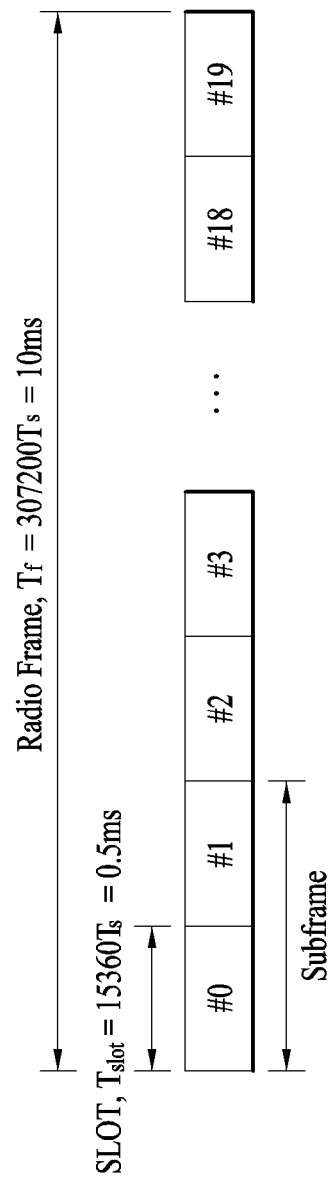
FIG. 5 is a diagram showing the structure of a radio frame used in a Long Term Evolution (LTE) system.

FIG. 5 is a diagram showing the structure of a radio frame used in a Long Term Evolution (LTE) system.

Referring to FIG. 5, the radio frame has a length of 10 ms ($327200 \times T_s$) and includes 10 subframes with the same size. Each subframe has a length of 1 ms and includes two slots. Each slot has a length of 0.5 ms ($15360 \times T_s$). $T_s$ denotes a sampling time, and is represented by $T_s=1/(15 \text{ kHz} \times 2048)=3.2552 \times 10^{-8}$ (about 33 ns). Each slot includes a plurality of OFDM symbols in a time domain, and includes a plurality of resource blocks (RBs) in a frequency domain. In the LTE system, one RB includes 12 subcarriers×7(6) OFDM or SC-FDMA symbols. A Transmission Time Interval (TTI) which is a unit time for transmission of data may be determined in units of one or more subframes. The structure of the radio frame is only exemplary and the number of subframes included in the radio frame, the number of slots included in the subframe, or the number of OFDM symbols included in the slot may be variously changed.

Recently, Proximity-based Service (ProSe) has been discussed in 3GPP. The ProSe enables different UEs to be connected (directly) each other (after appropriate procedure(s), such as authentication), through eNB only (but not further through Serving Gateway (SGW)/Packet Data Network Gateway (PDN-GW, PGW)), or through SGW/PGW. Thus, using the ProSe, device to device direct communication can be provided, and it is expected that every devices will be connected with ubiquitous connectivity. Direct communication between devices in a near distance can lessen the load of network. Recently, proximity-based social network services have come to public attention, and new kinds of proximity-based applications can be emerged and may create new business market and revenue. For the first step, public safety and critical communication are required in the market. Group communication is also one of key components in the public safety system. Required functionalities are: Discovery based on proximity, Direct path communication, and Management of group communications.

Use cases and scenarios are for example: i) Commercial/social use, ii) Network offloading, iii) Public Safety, iv) Integration of current infrastructure services, to assure the consistency of the user experience including reachability and mobility aspects, and v) Public Safety, in case of absence of EUTRAN coverage (subject to regional regulation and operator policy, and limited to specific public-safety designated frequency bands and terminals)

Figure 6:
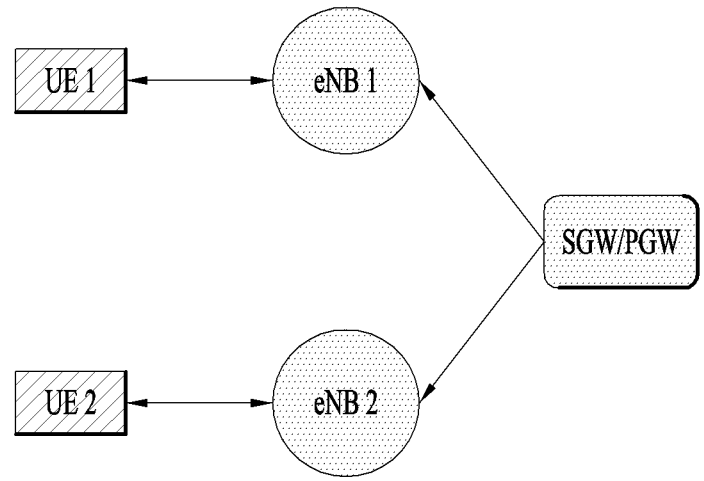
FIG. 6 is an example of default data path for a normal communication.

FIG. 6 is an example of default data path for communication between two UEs. With reference to FIG. 6, even when two UEs (e.g., UE1, UE2) in close proximity communicate with each other, their data path (user plane) goes via the operator network. Thus a typical data path for the communication involves eN B(s) and/or Gateway(s) (GW(s)) (e.g., SGW/PGW).

Figure 7:
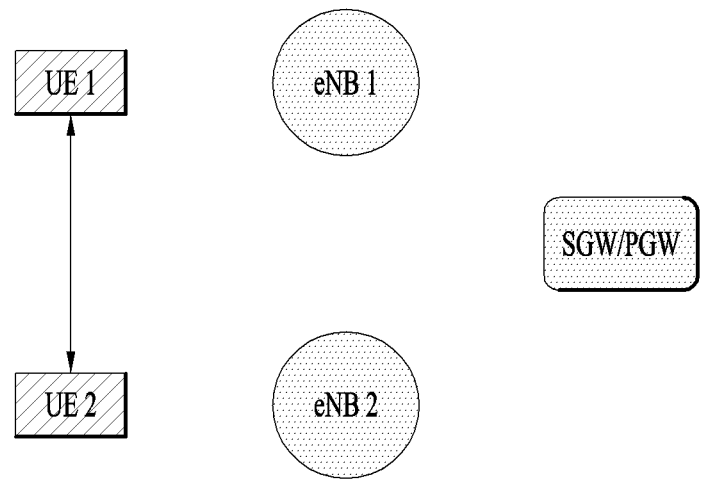
FIGS. 7 and 8 are examples of data path scenarios for a proximity communication.
Figure 8:
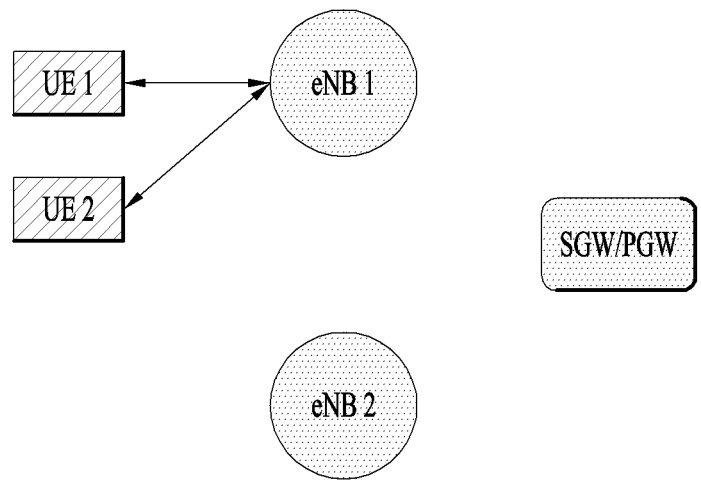

FIGS. 7 and 8 are examples of data path scenarios for a proximity communication. If wireless devices (e.g., UE1, UE2) are in proximity of each other, they may be able to use a direct mode data path (FIG. 7) or a locally routed data path (FIG. 8). In the direct mode data path, wireless devices are connected directly each other (after appropriate procedure(s), such as authentication), without eNB and SGW/PGW. In the locally routed data path, wireless devices are connected each other through eNB only.

Figure 9:
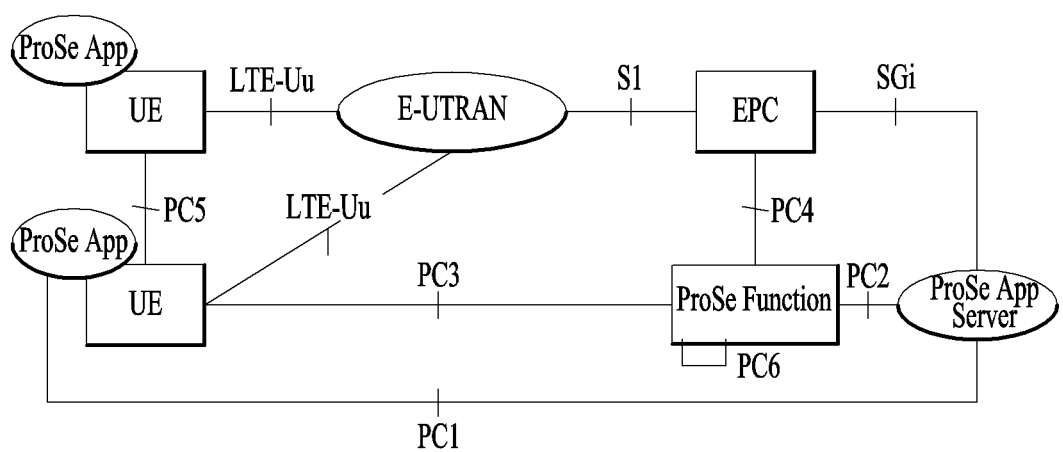
FIG. 9 is a conceptual diagram illustrating for a non-roaming reference architecture.

FIG. 9 is a conceptual diagram illustrating for a non-roaming reference architecture.

PC1 to PC 5 represent interfaces. PC1 is a reference point between a ProSe application in a UE and a ProSe App server. It is used to define application level signaling requirements. PC 2 is a reference point between the ProSe App Server and the ProSe Function. It is used to define the interaction between ProSe App Server and ProSe functionality provided by the 3GPP EPS via ProSe Function. One example may be for application data updates for a ProSe database in the ProSe Function. Another example may be data for use by ProSe App Server in interworking between 3GPP functionality and application data, e.g. name translation. PC3 is a reference point between the UE and ProSe Function. It is used to define the interaction between UE and ProSe Function. An example may be to use for configuration for ProSe discovery and communication. PC4 is a reference point between the EPC and ProSe Function. It is used to define the interaction between EPC and ProSe Function. Possible use cases may be when setting up a one-to-one communication path between UEs or when validating ProSe services (authorization) for session management or mobility management in real time.

PC5 is a reference point between UE to UE used for control and user plane for discovery and communication, for relay and one-to-one communication (between UEs directly and between UEs over LTE-Uu). Lastly, PC6 is a reference point may be used for functions such as ProSe Discovery between users subscribed to different PLMNs.

EPC (Evolved Packet Core) includes entities such as MME, S-GW, P-GW, PCRF, HSS etc. The EPC here represents the E-UTRAN Core Network architecture. Interfaces inside the EPC may also be impacted albeit they are not explicitly shown in FIG. 9.

Application servers, which are users of the ProSe capability for building the application functionality, e.g. in the Public Safety cases they can be specific agencies (PSAP) or in the commercial cases social media. These applications are defined outside the 3GPP architecture but there may be reference points towards 3GPP entities. The Application server can communicate towards an application in the UE.

Applications in the UE use the ProSe capability for building the application functionality. Example may be for communication between members of Public Safety groups or for social media application that requests to find buddies in proximity. The ProSe Function in the network (as part of EPS) defined by 3GPP has a reference point towards the ProSe App Server, towards the EPC and the UE.

The functionality may include but not restricted to e.g.:
Interworking via a reference point towards the 3rd party Applications
Authorization and configuration of the UE for discovery and Direct communication
Enable the functionality of the EPC level ProSe discovery
ProSe related new subscriber data and/handling of data storage; also handling of ProSe identities;
Security related functionality
Provide Control towards the EPC for policy related functionality
Provide functionality for charging (via or outside of EPC, e.g. offline charging)

Especially, the following identities are used for ProSe Direct Communication:
- Source Layer-2 ID identifies a sender of a D2D packet at PC5 interface. The Source Layer-2 ID is used for identification of the receiver RLC UM entity;
- Destination Layer-2 ID identifies a target of the D2D packet at PC5 interface. The Destination Layer-2 ID is used for filtering of packets at the MAC layer. The Destination Layer-2 ED may be a broadcast, groupcast or unicast identifier; and
- SA L1 ID identifier in Scheduling Assignment (SA) at PC5 interface. SA L1 ID is used for filtering of packets at the physical layer. The SA L1 ID may be a broadcast, groupcast or unicast identifier.

No Access Stratum signaling is required for group formation and to configure Source Layer-2 ID and Destination Layer-2 ID in the UE. This information is provided by higher layers.

In case of groupcast and unicast, the MAC layer will convert the higher layer ProSe ID (i.e. ProSe Layer-2 Group ID and ProSe UE ID) identifying the target (Group, UE) into two bit strings of which one can be forwarded to the physical layer and used as SA L1 ID whereas the other is used as Destination Layer-2 ID. For broadcast, L2 indicates to L1 that it is a broadcast transmission using a pre-defined SA L1 ID in the same format as for group- and unicast.

Figure 10:
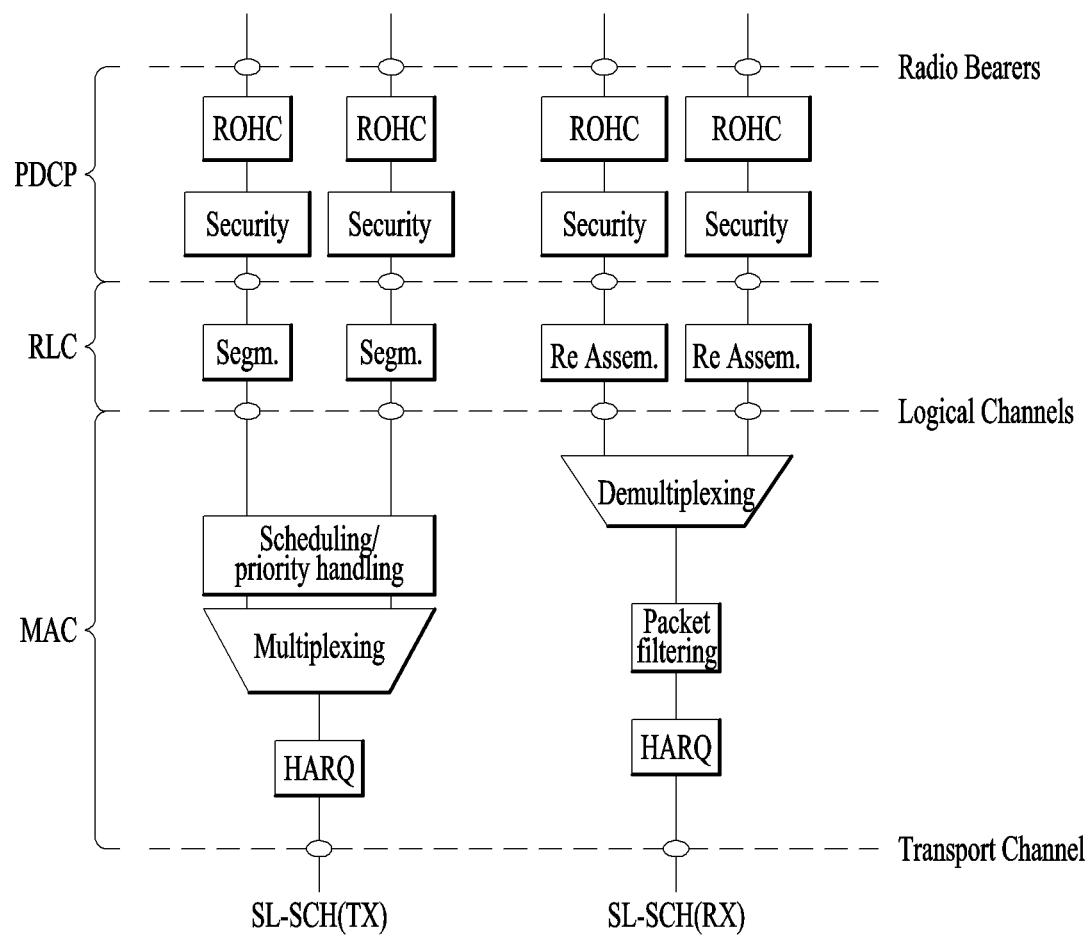
FIG. 10 is a conceptual diagram illustrating for a Layer 2 Structure for Sidelink.

FIG. 10 is a conceptual diagram illustrating for a Layer 2 structure for Sidelink.

The Sidelink is UE to UE interface for ProSe direct communication and ProSe Direct Discovery. Corresponds to the PC5 interface. The Sidelink comprises ProSe Direct Discovery and ProSe Direct Communication between UEs. The Sidelink uses uplink resources and physical channel structure similar to uplink transmissions. However, some changes, noted below, are made to the physical channels. E-UTRA defines two MAC entities; one in the UE and one in the E-UTRAN. These MAC entities handle the following transport channels additionally, i) sidelink broadcast channel (SL-BCH), ii) sidelink discovery channel (SL-DCH) and iii) sidelink shared channel (SL-SCH).

- Basic transmission scheme: the Sidelink transmission uses the same basic transmission scheme as the UL transmission scheme. However, sidelink is limited to single cluster transmissions for all the sidelink physical channels. Further, sidelink uses a 1 symbol gap at the end of each sidelink sub-frame.
- Physical-layer processing: the Sidelink physical layer processing of transport channels differs from UL transmission in the following steps:

i) Scrambling: for PSDCH and PSCCH, the scrambling is not UE-specific;
ii) Modulation: 64 QAM is not supported for Sidelink.
- Physical Sidelink control channel: PSCCH is mapped to the Sidelink control resources. PSCCH indicates resource and other transmission parameters used by a UE for PSSCH.
- Sidelink reference signals: for PSDCH, PSCCH and PSSCH demodulation, reference signals similar to uplink demodulation reference signals are transmitted in the 4th symbol of the slot in normal CP and in the 3rd symbol of the slot in extended cyclic prefix. The Sidelink demodulation reference signals sequence length equals the size (number of sub-carriers) of the assigned resource. For PSDCH and PSCCH, reference signals are created based on a fixed base sequence, cyclic shift and orthogonal cover code.
- Physical channel procedure: for in-coverage operation, the power spectral density of the sidelink transmissions can be influenced by the eNB.

Figure 11:
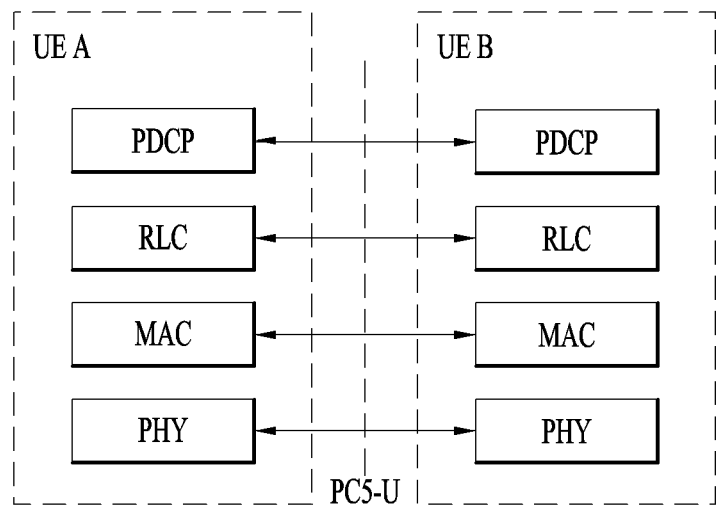
FIG. 11 is a conceptual diagram illustrating for protocol stack for ProSe Direct Communication.
Figure 11:
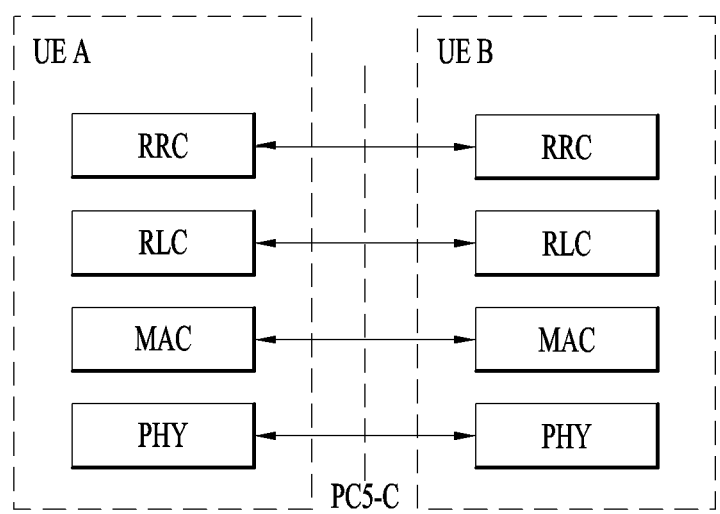

FIG. 11 is a conceptual diagram illustrating for protocol stack for ProSe Direct Communication.

FIG. 11(a) shows the protocol stack for the user plane, where PDCP, RLC and MAC sublayers (terminate at the other UE) perform the functions listed for the user plane (e.g. header compression, HARQ retransmissions). The PC5 interface consists of PDCP, RLC, MAC and PHY as shown in FIG. 11a.

User plane details of ProSe Direct Communication: i) MAC sub header contains LCIDs (to differentiate multiple logical channels), ii) The MAC header comprises a Source Layer-2 ID and a Destination Layer-2 ID, iii) At MAC Multiplexing/demultiplexing, priority handling and padding are useful for ProSe Direct communication, iv) RLC UM is used for ProSe Direct communication, v) Segmentation and reassembly of RLC SDUs are performed, vi) A receiving UE needs to maintain at least one RLC UM entity per transmitting peer UE, vii) An RLC UM receiver entity does not need to be configured prior to reception of the first RLC UM data unit, and viii) U-Mode is used for header compression in PDCP for ProSe Direct Communication.

FIG. 11(b) shows the protocol stack for the control plane, where RRC, RLC, MAC, and PHY sublayers (terminate at the other UE) perform the functions listed for the control plane. A D2D UE does not establish and maintain a logical connection to receiving D2D UEs prior to a D2D communication.

Figure 12:
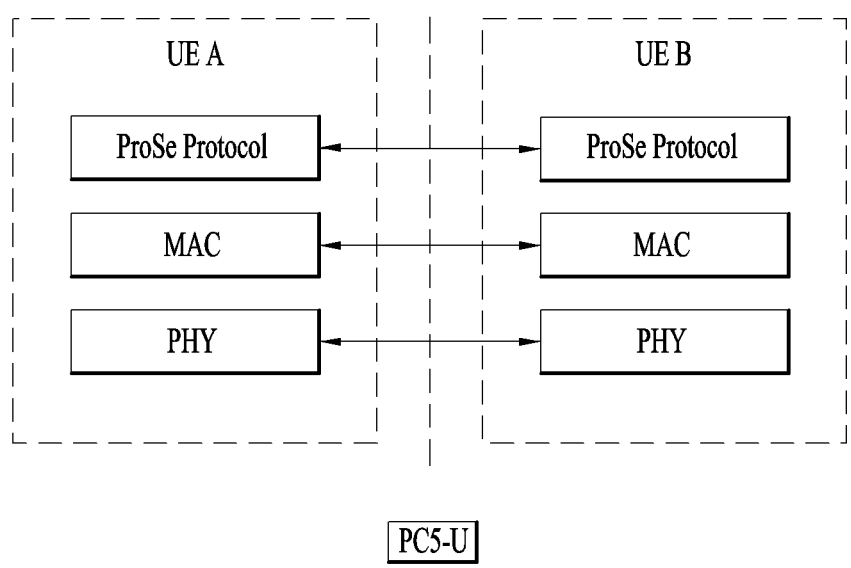
FIG. 12 is a conceptual diagram illustrating for a PC5 interface for ProSe Direct Discovery.

FIG. 12 is a conceptual diagram illustrating for a PC5 interface for ProSe Direct Discovery.

ProSe Direct Discovery is defined as the procedure used by the ProSe-enabled UE to discover other ProSe-enabled UE(s) in its proximity using E-UTRA direct radio signals via PC5.

Radio Protocol Stack (AS) for ProSe Direct Discovery is shown in FIG. 12.

The AS layer performs the following functions:
- Interfaces with upper layer (ProSe Protocol): The MAC layer receives the discovery information from the upper layer (ProSe Protocol). The IP layer is not used for transmitting the discovery information.
- Scheduling: The MAC layer determines the radio resource to be used for announcing the discovery information received from upper layer.
- Discovery PDU generation: The MAC layer builds the MAC PDU carrying the discovery information and sends the MAC PDU to the physical layer for transmission in the determined radio resource. No MAC header is added.

There are two types of resource allocation for discovery information announcement.
- Type 1: A resource allocation procedure where resources for announcing of discovery information are allocated on a non UE specific basis, further characterized by: i) The eNB provides the UE(s) with the resource pool configuration used for announcing of discovery information. The configuration may be signalled in SIB, ii) The UE autonomously selects radio resource(s) from the indicated resource pool and announce discovery information, iii) The UE can announce discovery information on a randomly selected discovery resource during each discovery period.
- Type 2: A resource allocation procedure where resources for announcing of discovery information are allocated on a per UE specific basis, further characterized by:

i) The UE in RRC_CONNECTED may request resource(s) for announcing of discovery information from the eNB via RRC, ii) The eNB assigns resource(s) via RRC, iii) The resources are allocated within the resource pool that is configured in UEs for monitoring.

For UEs in RRC_IDLE, the eNB may select one of the following options:

The eNB may provide a Type 1 resource pool for discovery information announcement in SIB. UEs that are authorized for Prose Direct Discovery use these resources for announcing discovery information in RRC_IDLE.

The eNB may indicate in SIB that it supports D2D but does not provide resources for discovery information announcement. UEs need to enter RRC Connected in order to request D2D resources for discovery information announcement.

For UEs in RRC_CONNECTED,

A UE authorized to perform ProSe Direct Discovery announcement indicates to the eNB that it wants to perform D2D discovery announcement.

The eNB validates whether the UE is authorized for ProSe Direct Discovery announcement using the UE context received from MME.

The eNB may configure the UE to use a Type 1 resource pool or dedicated Type 2 resources for discovery information announcement via dedicated RRC signaling (or no resource).

The resources allocated by the eNB are valid until a) the eNB de-configures the resource(s) by RRC signaling or b) the UE enters IDLE. (FFS whether resources may remain valid even in IDLE).

Receiving UEs in RRC_IDLE and RRC_CONNECTED monitor both Type 1 and Type 2 discovery resource pools as authorized. The eNB provides the resource pool configuration used for discovery information monitoring in SIB. The SIB may contain discovery resources used for announcing in neighbor cells as well.

Hereinafter, it is explained the method for triggering sidelink connection establishment between the remote UE and the relay UE.

Before sending the sidelink discovery/communication message, the remote UE is required to check RSRP (Reference Signal Received Power) condition for the serving cell. The measured RSRP for the serving needs to be below the configured threshold if the threshold is configured. This threshold is introduced for limiting the area for using relay UE, since the remote UE could be well served by the network when the RSRP condition is good. There is no problem in applying the above behavior to a public safety (PS) UE since the battery consumption is not that important for the PS UE.

However, the wearable devices have a limited battery capability, so energy efficient operation is crucial criteria for success especially of the wearables.

In case of that PS UEs and wearable devices are in the same cell and the above mentioned threshold is provided for discovery/communication transmission, there needs to be some method for the wearable devices to operate in energy efficient way.

According to the present invention, it is assumed that:

The sidelink procedure is operated in serving carrier of the remote UE or in dedicated carrier for sidelink operation. The technology for sidelink operation involves a LTE sidelink and UE to network relaying over non-3GPP access (e.g., using WiFi/Bluetooth).

The RSRP/RSRQ (Reference Signal Received Quality) threshold to transmit the communication/discovery message is configured and the (remote/relay) UE is required to meet the threshold condition in order to transmit the communication/discovery messages.

Base on the assumption, the present invention suggests not to apply (or method to ignore) the configured threshold. More specifically, according to the present invention, the remote UE does not apply the configured threshold(s) when transmitting the discovery/communication messages or transmits the discovery/communication messages regardless of the configured threshold(s), in one or more among the following 1)~7) cases.

1) The user of the remote UE has activated discovery procedure.

2) The remote UE has already found/selected the nearby relay UE via discovery messages from relay UE.

3) The remote UE has already found the nearby relay via discovery messages from relay UE and the channel quality (e.g., SD-RSRP, RSRP, RSSI or SINR) is above the threshold.

4) The network has indicated to the remote UE via dedicated signaling that the UE is allowed to transmit discovery/communication message regardless of the broadcasted thresholds.

5) The network broadcasts the UE category (e.g. Cat. M1, Cat.0) which is allowed to transmit discovery/communication message regardless of the broadcasted thresholds and the remote UE belongs to the broadcasted UE category.

6) The network broadcasts the service categories which are allowed to transmit discovery/communication message regardless of the broadcasted thresholds and the operating service category of the remote UE belongs to the broadcasted service category. The example of service category is PS, non-PS, commercial.

7) The battery level of the remote UE is less than a threshold.

Further, for the remote UE to find the relay UE, the relay UE firstly can send the discovery/communication message. In other words, the relay UE does not apply the configured threshold(s) when transmitting discovery/communication messages or transmits discovery/communication messages regardless of the configured threshold(s), in one or more among the following a)~f) cases.

a) The user of the relay UE has activated discovery procedure.

b) The relay UE has already found/selected the nearby remote UE via discovery messages from remote UE.

c) The relay UE has already found the nearby remote via discovery messages from remote UE and the channel quality (e.g. SD-RSRP, RSRP, RSSI or SINR) is above the threshold.

d) The network has indicated to the relay UE via dedicated signalling that the UE is allowed to transmit discovery/communication message regardless of the broadcasted thresholds.

e) The network broadcasts the UE category (e.g. Cat. M1, Cat.0) which is allowed to transmit discovery/communication message regardless of the broadcasted thresholds and the remote UE belongs to the broadcasted UE category.

f) The network broadcasts the service categories which are allowed to transmit discovery/communication message regardless of the broadcasted thresholds and the operating service category of the remote UE belongs to the broadcasted service category. The example of service category is PS, non-PS, commercial.

Preferably, the thresholds are RSRP/RSRQ thresholds. The UE should compare the reference cell quality with the indicated threshold if the UE is not allowed to ignore the threshold. If the UE is not allowed to ignore the threshold, the UE is allowed to transmit discovery/communication messages when the reference cell quality is equal to and/or below the threshold. In the above, the thresholds are provided by the network via dedicated/broadcast signaling or fixed. More preferably, the remote/relay UE can be RRC connected or RRC idle state.

Figure 13:
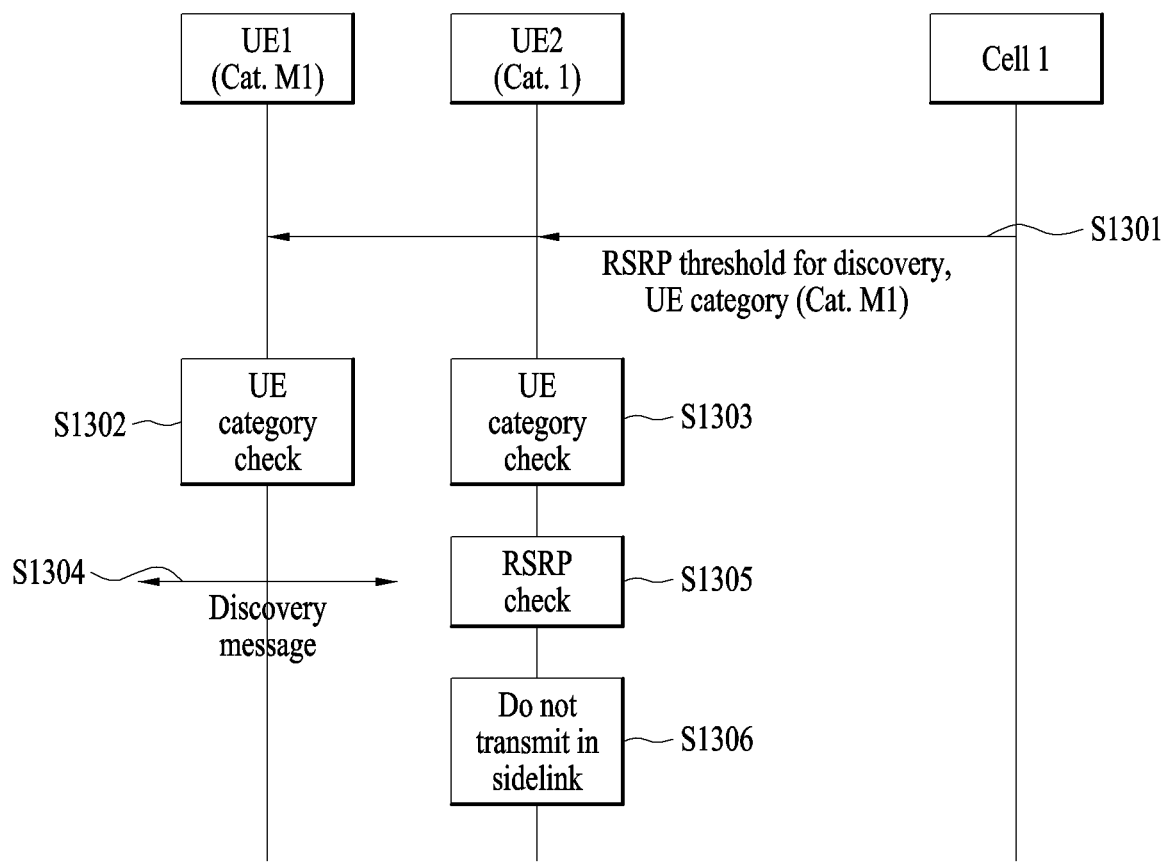
FIG. 13 is a flow chart illustrating an operation in accordance with a first embodiment of the present invention.

FIG. 13 is a flow chart illustrating an operation in accordance with a first embodiment of the present invention. Especially, in FIG. 13, it is assumed that serving cell quality of both UE1 and UE2 is above the configured threshold. And it is also assumed that the UE1 is Category M1 and UE2 is Category 1. Both UEs are configured by upper layer to transmit the discovery/communication message.

Referring to FIG. 13, in S1301, the network (i.e., cell 1) broadcasts RSRP threshold for remote/relay UE determining whether the UE is allowed to transmit discovery/communication message. The network additionally broadcasts UE category whether the UE is allowed to transmit discovery message regardless of the configured threshold in S1301.

Alternatively, the network additionally broadcasts UE category information which indicates whether the UE should perform checking whether the RSRP of the reference cell is below the threshold. In this case, if the UE is one of the indicated UE category, the UE should perform checking whether the RSRP of the reference cell is below the threshold before transmitting the sidelink discovery/communication messages. If the RSRP of reference cell is below the threshold, the UE is allowed to transmit sidelink discovery/communication messages.

Next, in S1302 and S1303, the UE1 and UE2 determine whether the UE is allowed to transmit discovery message regardless of the configured threshold through the broadcasted UE category information. In this case, since the UE1 is the allowed UE category (i.e. Cat.M1), in S1304, the UE1 transmits the discovery message in sidelink. However, since the UE2 is not the allowed UE category, in S1305, UE2 additionally check whether the serving cell quality is below the configured threshold value. Therefore, when serving cell quality of the UE2 is above the configured threshold, the UE2 does not send the discovery message in sidelink such as S1306.

Figure 14:
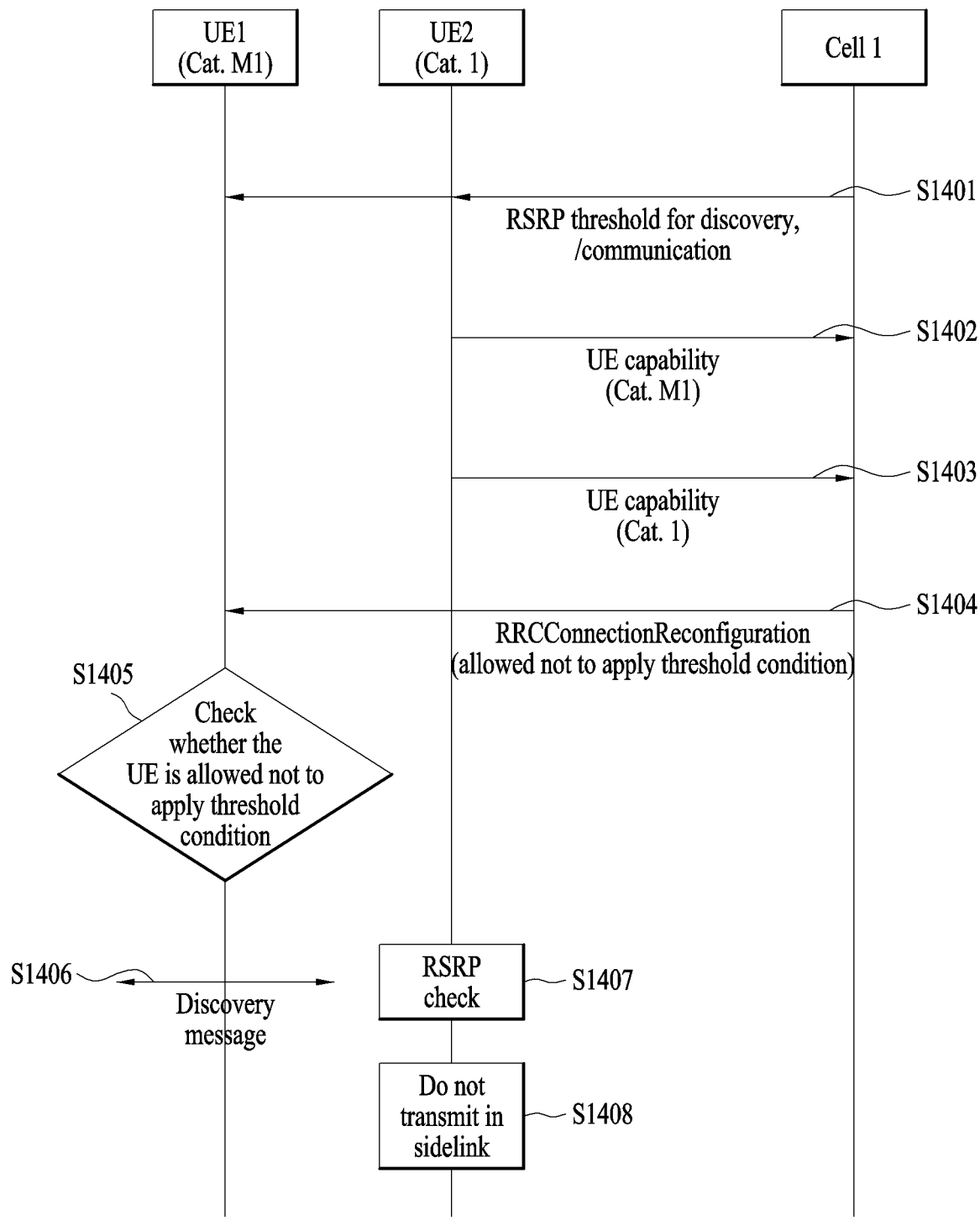
FIG. 14 is a flow chart illustrating an operation in accordance with a second embodiment of the present invention.

FIG. 14 is a flow chart illustrating an operation in accordance with a second embodiment of the present invention. Especially, in FIG. 14, it is assumed that serving cell quality of both UE1 and UE2 is above the configured threshold. And, it is also assumed that the UE1 is Category M1 and UE2 is Category 1. Both UEs are configured by the upper layer to transmit the discovery message.

Referring to FIG. 14, in S1401, the network (i.e., cell 1) broadcasts RSRP threshold for remote/relay UE determining whether the UE is allowed to transmit discovery/communication message. And, in S1402 and S1403, the UE1 and UE2 send to the UE category information to the network when the UE establishes RRC connection if the network requests to send UE capability information. Next, the network configures the UE1 that the UE is allowed not to apply RSRP condition when the UE transmits the sidelink discovery/communication message via the sidelink, in S1404.

In this case, if the upper layer of the UE1 configures lower layer to transmit the sidelink discovery/communication messages via the sidelink, the UE1 checks whether the UE is allowed not to apply RSRP threshold condition, in S1405. If the UE1 is configured to not apply RSRP threshold condition check before transmitting sidelink discovery/communication messages, the UE1 transmits the sidelink discovery/communication messages via the sidelink such as S1406

However, since UE2 is not configured to serving cell quality is above the configured threshold, in S1407 the UE2 performs RSRP conditions before transmitting sidelink discovery/communication messages. If the RSRP of the reference cell (e.g., serving cell) of the UE2 is below or equal to the configured threshold, the UE2 transmits the sidelink discovery/communication messages via the sidelink, in S1408. Otherwise, the UE2 is not allowed to transmit sidelink discovery/communication messages via the sidelink.

Figure 15:
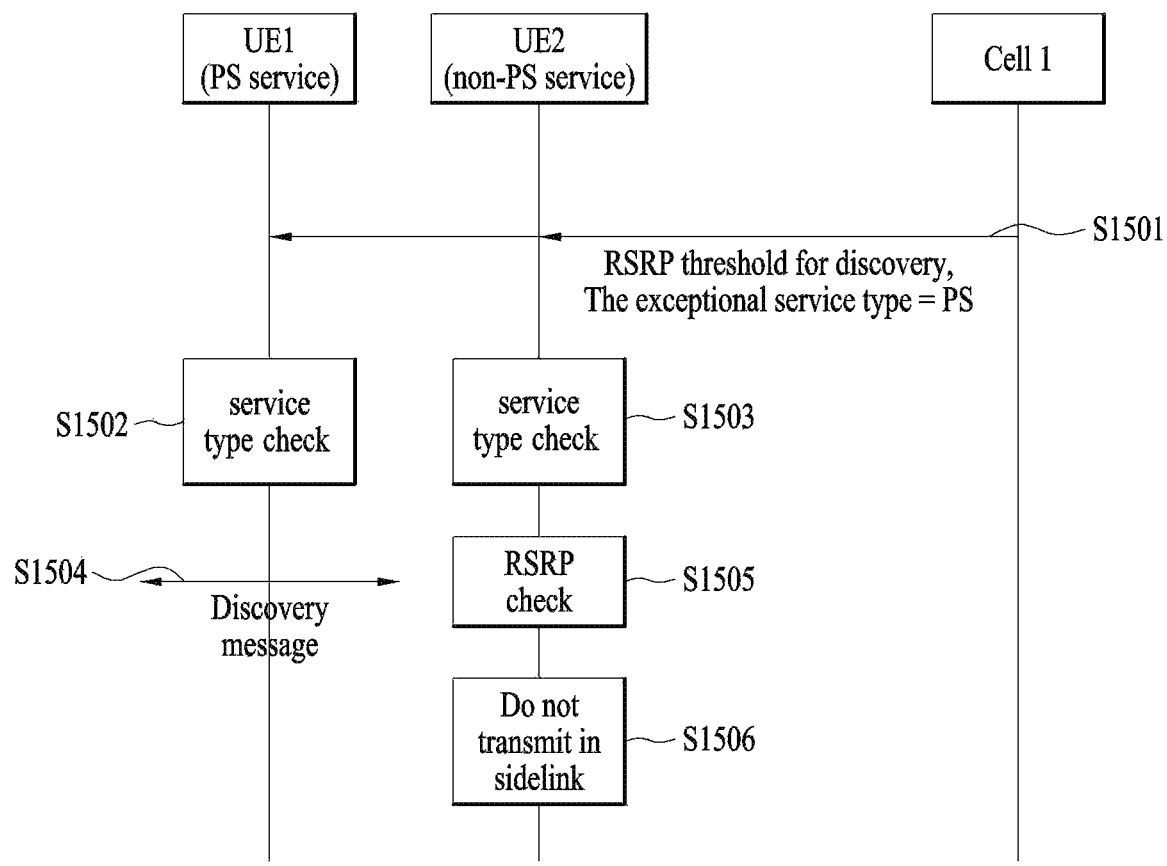
FIG. 15 is a flow chart illustrating an operation in accordance with a third embodiment of the present invention.

FIG. 15 is a flow chart illustrating an operation in accordance with a third embodiment of the present invention. Especially, it is assumed that serving cell quality of both UE1 and UE2 is above the configured threshold. And it is also assumed that the UE1 is operating with PS service while UE2 is operating with non-PS service. Both UEs are configured by upper layer to transmit the discovery/communication message Referring to FIG. 15, in S1501, the network (i.e., cell 1) broadcasts RSRP threshold for remote/relay UE determining whether the UE is allowed to transmit discovery/communication message. The network additionally broadcasts service type information which indicates the UE is allowed to transmit discovery message regardless of the configured threshold if the indicated service type is operated by the UE in S1501.

Alternatively, the network additionally broadcasts service type information which indicates the UE should perform checking whether the RSRP of the reference cell is below the threshold. In this case, if the UE is operated with one of the indicated service type, the UE should perform checking whether the RSRP of the reference cell is below the threshold before transmitting sidelink discovery/communication messages. If the RSRP of reference cell is below the threshold, the UE is allowed to transmit sidelink discovery/communication messages.

In this case, in S1502 and S1503, the UE1 and UE2 determines whether the UE is allowed to transmit discovery message regardless of the configured threshold through the broadcasted service information.

Therefore, if UE1 is operating with the indicated service type (i.e., public safety application), the UE1 does not perform comparing RSRP of the reference cell with the indicated threshold and transmits the discovery message in sidelink in S1504.

However, Since the UE2 is not operating with the indicated service type (i.e., non-public safety application), in S1505, the UE2 checks whether the reference cell quality (e.g., RSRP) is below the configured threshold value. Thus, when reference cell quality of UE2 is above the configured threshold, the UE2 determines not to send the discovery message in sidelink such as in S1506.

Figure 16:
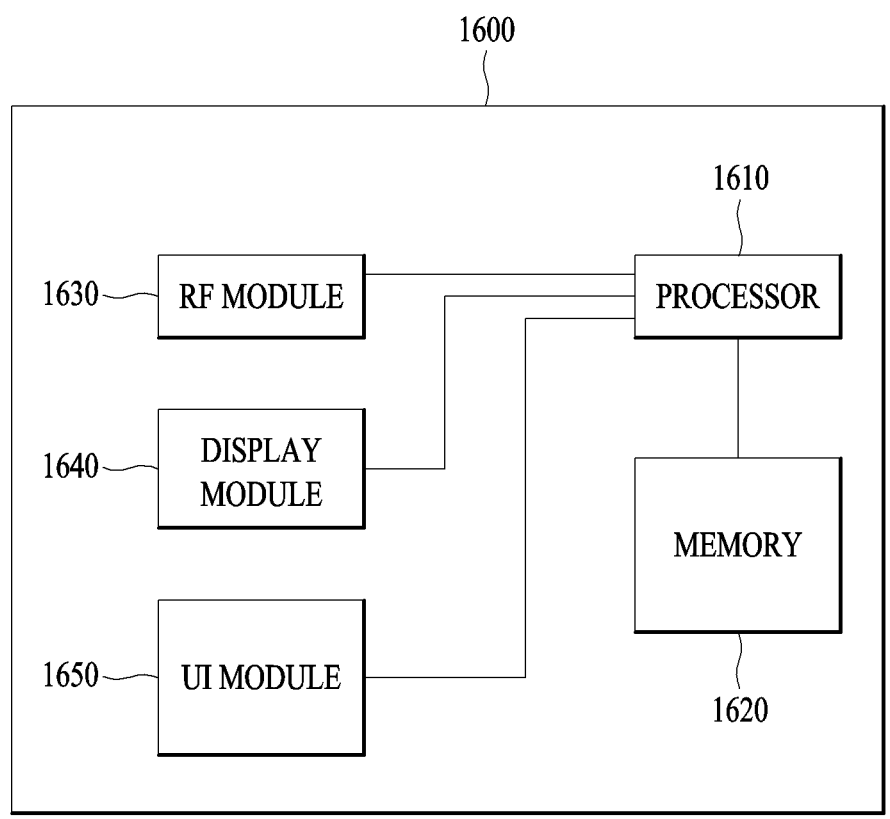
FIG. 16 is a block diagram of a communication apparatus according to an embodiment of the present invention.

FIG. 16 is a block diagram illustrating a communication apparatus in accordance with an embodiment of the present invention.

Referring to FIG. 16, a communication device 1600 includes a processor 1610, a memory 1620, a Radio Frequency (RF) module 1630, a display module 1640, and a user interface module 1650.

The communication device 1600 is illustrated for convenience of the description and some modules may be omitted. Moreover, the communication device 1600 may further include necessary modules. Some modules of the communication device 1600 may be further divided into sub-modules. The processor 1610 is configured to perform operations according to the embodiments of the present invention exemplarily described with reference to the figures. Specifically, for the detailed operations of the processor 1610, reference may be made to the contents described with reference to FIGS. 1 to 15.

The memory 1620 is connected to the processor 1610 and stores operating systems, applications, program code, data, and the like. The RF module 1630 is connected to the processor 1610 and performs a function of converting a baseband signal into a radio signal or converting a radio signal into a baseband signal. For this, the RF module 1630 performs analog conversion, amplification, filtering, and frequency upconversion or inverse processes thereof. The display module 1640 is connected to the processor 1610 and displays various types of information. The display module 1640 may include, but is not limited to, a well-known element such as a Liquid Crystal Display (LCD), a Light Emitting Diode (LED), or an Organic Light Emitting Diode (OLED). The user interface module 1650 is connected to the processor 1610 and may include a combination of well-known user interfaces such as a keypad and a touchscreen.

The above-described embodiments are combinations of elements and features of the present invention in a predetermined manner. Each of the elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. In the appended claims, it will be apparent that claims that are not explicitly dependent on each other can be combined to provide an embodiment or new claims can be added through amendment after the application is filed.

The embodiments according to the present invention can be implemented by various means, for example, hardware, firmware, software, or combinations thereof. In the case of a hardware configuration, the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In the case of a firmware or software configuration, the method according to the embodiments of the present invention may be implemented by a type of a module, a procedure, or a function, which performs functions or operations described above. For example, software code may be stored in a memory unit and then may be executed by a processor. The memory unit may be located inside or outside the processor to transmit and receive data to and from the processor through various well-known means.

The present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents and all changes coming within the meaning and equivalency range of the appended claims are intended to be embraced therein.

What is claimed is:

1. A method for transmitting a sidelink signal by a user equipment (UE) in a wireless communication system, the method comprising:
   receiving, from a network, a threshold value for a transmission of the sidelink signal;
   transmitting, to the network, UE capability information including a UE category of the UE;
   wherein, when the UE category is a specific UE category, the method further comprises:
   receiving information about a specific service type allowed to transmit the sidelink signal regardless of the threshold value;
   when the UE is not operating with the specific service type, measuring a quality of a serving cell of the UE; and
   transmitting the sidelink signal to a target UE when the quality of the serving cell is less than the threshold value,
   wherein when the UE is operating with the specific service type, transmitting the sidelink signal to the target UE without measuring the quality of the serving cell,
   wherein, when the UE category is not the specific UE category, the method further comprises:
   measuring the quality of the serving cell of the UE and transmitting the sidelink signal to the target UE when the quality of the serving cell is less than the threshold value without determining whether the UE is operating with the specific service type or not,
   wherein when the quality of the serving cell is greater than or equal to the threshold value, the sidelink signal is not transmitted to the target UE.

2. The method of claim 1, wherein the sidelink signal comprises a discovery signal for discovering the target UE or for announcing an existence of the UE.

3. The method of claim 1, wherein the specific service type comprises a public safety service type.

4. A user equipment (UE) in a wireless communication system, the UE comprising:
   a receiver and transmitter; and
   a processor, operatively coupled to the receiver and transmitter, wherein the processor is configured to:
   control the receiver to receive, from a network, a threshold value for a transmission of a sidelink signal;
   control the transmitter to transmit, to the network, UE capability information including a UE category of the UE, wherein, if the UE category is a specific UE category, the processor is further configured to:
   control the receiver to receive, from the network, information on a specific service type allowed to transmit the sidelink signal regardless of the threshold value,
   wherein when the UE is not operating with the specific service type, measure a quality of a serving cell of the UE; and
   control the transmitter to transmit the sidelink signal to a target UE, when the measured quality of the serving cell is less than the threshold value,
   wherein when the UE is operating with the specific service type, control the transmitter to transmit the sidelink signal to the target UE without measuring the quality of the serving cell;
   wherein when the UE category is not the specific UE category, the processor is further configured to:
   measure the quality of the serving cell of the UE; and
   control the transmitter to transmit the sidelink signal to the target UE when the quality of the serving cell is less than the threshold value without determining whether the UE is operating with the specific service type or not,
wherein when the quality of the serving cell is greater than or equal to the threshold value, the processor does not control the transmitter to transmit the sidelink signal to the target UE.

5. The UE of claim 4, wherein the sidelink signal comprises a discovery signal for discovering the target UE or for announcing an existence of the UE.

6. The UE of claim 4, wherein the specific service type comprises a public safety service type.

* * * * *